US010339551B2

(12) United States Patent
Chauhan

(10) Patent No.: US 10,339,551 B2
(45) Date of Patent: Jul. 2, 2019

(54) METHOD AND SYSTEM TO ASSESS FINDER'S FEE FOR CUSTOMER TRAFFIC AT A MERCHANT LOCATION

(71) Applicant: MasterCard International Incorporated, Purchase, NY (US)

(72) Inventor: Rohit Chauhan, Somers, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 231 days.

(21) Appl. No.: 14/055,354

(22) Filed: Oct. 16, 2013

(65) Prior Publication Data

US 2015/0106176 A1    Apr. 16, 2015

(51) Int. Cl.
*G06Q 30/02* (2012.01)

(52) U.S. Cl.
CPC .................. *G06Q 30/0214* (2013.01)

(58) Field of Classification Search
CPC .......... H04W 12/08; H04W 4/02; G08G 1/20; G08G 1/096716; G08G 1/096741; G08G 1/096775; G06Q 30/0246; G06Q 20/20; G06Q 20/22; G06Q 30/02; G06Q 20/3827
USPC ..................... 455/456.3, 90.2, 466
See application file for complete search history.

(56) References Cited

U.S. PATENT DOCUMENTS

| 8,315,905 B1 * | 11/2012 | Adair | G06Q 30/0261 379/93.12 |
| 2006/0064346 A1 * | 3/2006 | Steenstra | G06Q 30/0261 705/14.64 |
| 2008/0052276 A1 * | 2/2008 | Tzamaloukas | G06F 17/30943 |
| 2008/0154654 A1 * | 6/2008 | Niessen | G06Q 10/02 705/5 |
| 2010/0069093 A1 * | 3/2010 | Morrison | G08G 1/096716 455/456.3 |

* cited by examiner

*Primary Examiner* — Naresh Vig
(74) *Attorney, Agent, or Firm* — Buchanan Ingersoll & Rooney PC

(57) ABSTRACT

A method for assessing a finder's fee for directing merchant traffic includes: transmitting, by a transmitting device, offer data related to an offer for the purchase of goods or services to a mobile communication device, wherein the related offer is associated with a merchant; receiving, by a receiving device, an indication that a user of the mobile communication device viewed the transmitted offer data; receiving, by the receiving device, an indication that the mobile communication device was located at a geographic location associated with the merchant within a predetermined period of time of the viewing of the transmitted offer data by the user of the mobile communication device; generating, by a processing device, an authorization request for a payment transaction for a finder's fee to be paid by the merchant; and transmitting, by the transmitting device, the authorization request.

14 Claims, 6 Drawing Sheets

METHOD AND SYSTEM TO ASSESS FINDER'S FEE FOR CUSTOMER TRAFFIC AT A MERCHANT LOCATION

FIELD

The present disclosure relates to the assessing of a finder's fee for directing consumer traffic to a merchant, specifically the assessing of a finder's fee for a consumer driven to a merchant location following the distribution of an offer to the merchant to the consumer's mobile device.

BACKGROUND

For many merchants with physical storefront locations, a goal to generating more revenue and more business overall is to drive more consumers to its store, as consumers are often more influenced to purchase if they are already inside the store. Many merchants may offer various promotions, sales, or special deals that are advertised via traditional methods in order to drive more consumer traffic to the store. However, for many businesses, particularly small businesses, developing marketing strategies and organizing advertisements may be an expensive, resource-intensive, and daunting task.

In order to ease the burden of developing marketing strategies and advertising campaigns, many businesses may hire outside vendors to perform these actions on their behalf. However, it is often difficult to track the success of such campaigns. While a merchant may be able to adequately measure the traffic into their physical storefront, methods used to measure the reason that consumers visited the store, such as surveys and polls, may often be both difficult to manage and time consuming.

Thus, there is a need for a technical solution to provide for a method to both adequately identify when a consumer is driven to a merchant location and provide compensation as a result of the driven traffic.

SUMMARY

The present disclosure provides a description of systems and methods for assessing a finder's fee for directing merchant traffic.

A method for assessing a finder's fee for directing merchant traffic includes: transmitting, by a transmitting device, offer data related to an offer for the purchase of goods or services to a mobile communication device, wherein the related offer is associated with a merchant; receiving, by a receiving device, an indication that a user of the mobile communication device viewed the transmitted offer data; receiving, by the receiving device, an indication that the mobile communication device was located at a geographic location associated with the merchant within a predetermined period of time of the viewing of the transmitted offer data by the user of the mobile communication device; generating, by a processing device, an authorization request for a payment transaction for a finder's fee to be paid by the merchant; and transmitting, by the transmitting device, the authorization request.

A system for assessing a finder's fee for directing merchant traffic includes a transmitting device, a receiving device, and a processing device. The transmitting device is configured to transmit offer data related to an offer for the purchase of goods or services to a mobile communication device, wherein the related offer is associated with a merchant. The receiving device is configured to: receive an indication that a user of the mobile communication device viewed the transmitted offer data; and receive an indication that the mobile communication device was located at a geographic location associated with the merchant within a predetermined period of time of the viewing of the transmitted offer data by the user of the mobile communication device. The processing device is configured to generate an authorization request for a payment transaction for a finder's fee to be paid by the merchant. The transmitting device is further configured to transmit the authorization request.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

System for Assessing a Finder's Fee for Directing Merchant Traffic

Figure 1:
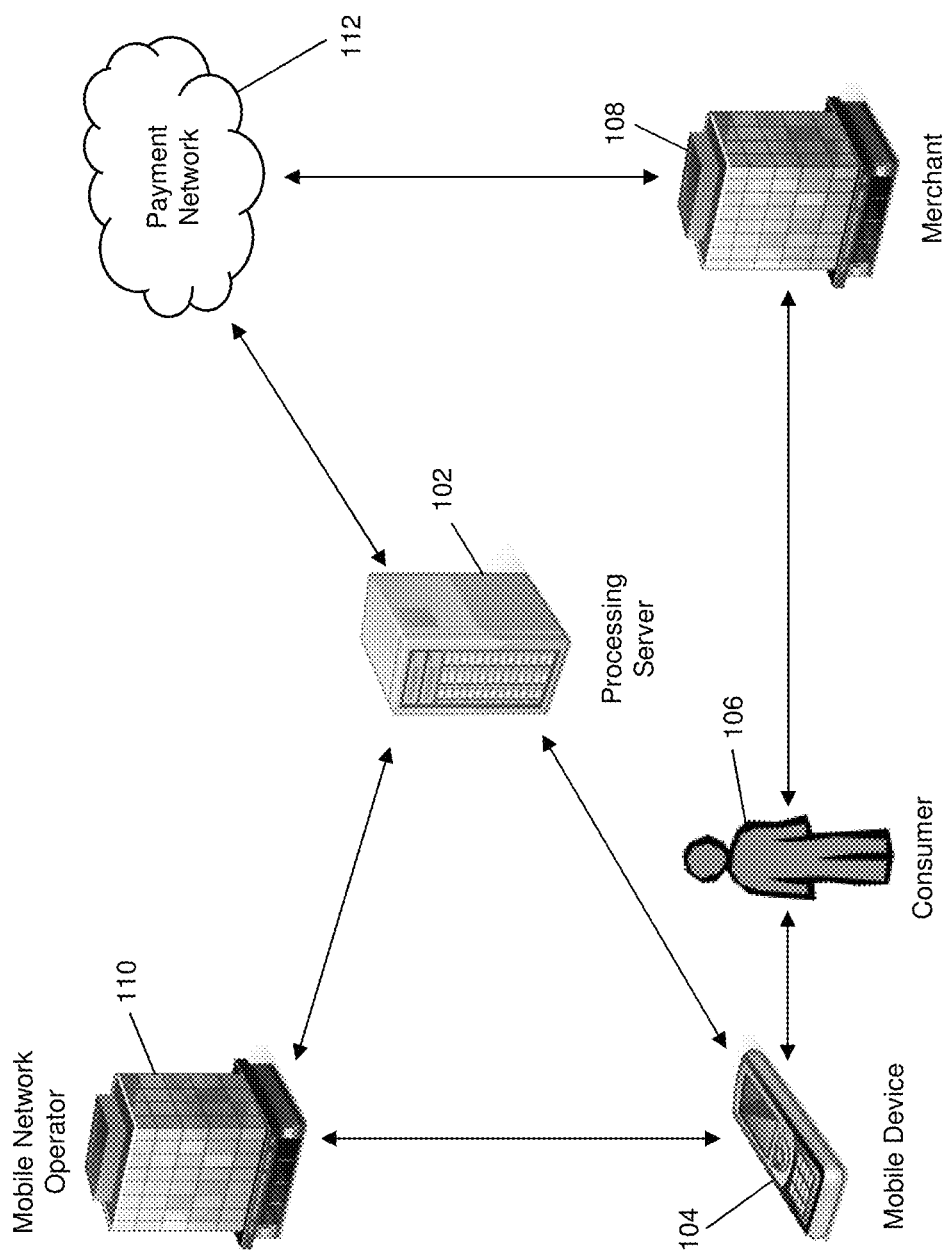
FIG. 1 is a high level architecture illustrating a system for assessing a finder's fee for directing merchant traffic in accordance with exemplary embodiments.

FIG. 1 illustrates a system 100 for assessing a finder's fee for directing a consumer to a merchant via the distribution of an offer to a mobile device.

A processing server 102, discussed in more detail below, may be configured to distribute an offer for the purchase of goods or services to a mobile device 104 associated with a consumer 106. In some embodiments, the offers may be first received from an offer provider, merchant, manufacturer, retailer, or other third party, and stored in an offer database at the processing server 102, as discussed in more detail below. The mobile device 104 may receive the offer data and present the related offer to the consumer 106. The mobile device 104 may be any suitable type of mobile communication device as will be apparent to persons having skill in the relevant art, such as a cellular phone, smart phone, tablet computer, laptop computer, etc.

The mobile device 104 may identify when the consumer 106 views the offer on the mobile device 104. When the consumer 106 views the offer, the mobile device 104 may transmit a notification to the processing server 102 indicating that the consumer 106 had viewed the offer. The processing server 102 may store the notification and/or indication thereof in a consumer profile for the consumer 106 in a consumer database, discussed in more detail below.

The consumer 106 may then visit a merchant 108 corresponding to the received offer. A geographic location of the mobile device 104 may be identified as being located at the merchant 108. The geographic location of the mobile device 104 may be identified by a mobile network operator 110 associated with the mobile device 104 using systems and methods that will be apparent to persons having skill in the relevant art, such as cellular network triangulation, the global positioning system, connection by the mobile device 104 to a wireless network located at the geographic location, reading of a machine-readable code at the geographic location, receiving of an audio signal at the geographic location, etc. The mobile network operator 110 may transmit the identified geographic location of the mobile device 104 to the processing server 102. In some embodiments, the mobile device 104 may identify its geographic location and transmit it directly to the processing server 102.

The processing server 102 may receive the geographic location and identify the mobile device 104 as being located at the merchant 108 following the viewing of the offer corresponding to the merchant 108 by the consumer 106. The processing server 102 may thus identify that the consumer 106 was driven to the merchant 108 as a result of the offer. The processing server 102 may then generate an authorization request for a payment transaction involving the merchant 108 and the offer provider (e.g., the processing server 102 or a third party) to assess a finder's fee to the offer provider to be paid by the merchant 108 for the directing of the consumer traffic. The processing server 102 may transmit the generated authorization request to a payment network 112 for processing using systems and methods that will be apparent to persons having skill in the relevant art.

In an exemplary embodiment, the processing server 102 may only assess the finder's fee if the consumer 106 visits the merchant 108 within a predetermined period of time after viewing of the offer by the consumer 106 and/or after receipt of the offer by the mobile device 104. The processing server 102 may thus generate the authorization request for the payment transaction to assess the finder's fee only if the geographic location of the mobile device 104 is identified as being located at the merchant 108 during the predetermined period of time.

The predetermined period of time may be determined by the processing server 102, the merchant 108, the offer provider, or any other suitable party. In some instances, the predetermined period of time may be based on a merchant category or industry of the merchant 108. For example, the predetermined period of time may be lower for a convenience store with a large number of easily accessible locations, and may be higher for a large specialty store with a single, less-accessible location. The predetermined period of time may also be based on the type of offer. For example, an offer that has a higher offer value or a short period of availability may have a shorter predetermined period of time. Additional basis for the predetermined period of time may include the geographic location, the time at which the offer was transmitted to the mobile device 104, the date, the consumer 106, and other suitable criteria as will be apparent to persons having skill in the relevant art.

In some embodiments, the payment network 112 may transmit a notification to the processing server 102 of a payment transaction involving the merchant 108 and the consumer 106 following the assessing of the finder's fee. In such an embodiment, the processing server 102 may determine that the consumer 106 engaged in a payment transaction with the merchant 108 as result of the original distribution of the offer to the mobile device 104. The processing server 102 may then generate an authorization request to assess an additional referral fee to the offer provider from the merchant 108 as a result of the successful transaction. In some instances, the processing server 102 may assess the referral fee only if the payment network 112 indicates (e.g., as indicated in an authorization request for the payment transaction involving the merchant 108 and the consumer 106) that the consumer 106 redeemed the offer that was previously distributed to the mobile device 104.

In some instances, the processing server 102 may only distribute an offer to the mobile device 104 if the mobile device 104 is identified as being located within a specific geographic area associated with the offer or the related merchant 108. In such an instance, the consumer 106 may be more influenced to visit the merchant 108 as a result of receiving the offer.

In another instance, the processing server 102 may assess a finder's fee if the mobile device 104 receives the offer, the consumer 106 visits the merchant 108 within the predetermined period of time, and then the consumer 106 views the offer while already at the merchant 108. In such an instance, the consumer 106 may be influenced to visit the merchant 108 based on the received offer, but may not view the offer to identify the details of the offer until arriving at the merchant 108. As such, the processing server 102 may still assess the finder's fee as the offer directed the consumer 106 to the merchant 108. In one instance, the processing server 102 may only assess the finder's fee in such a situation based on an agreement between the merchant 108 and the offer provider.

Processing Device

Figure 2:
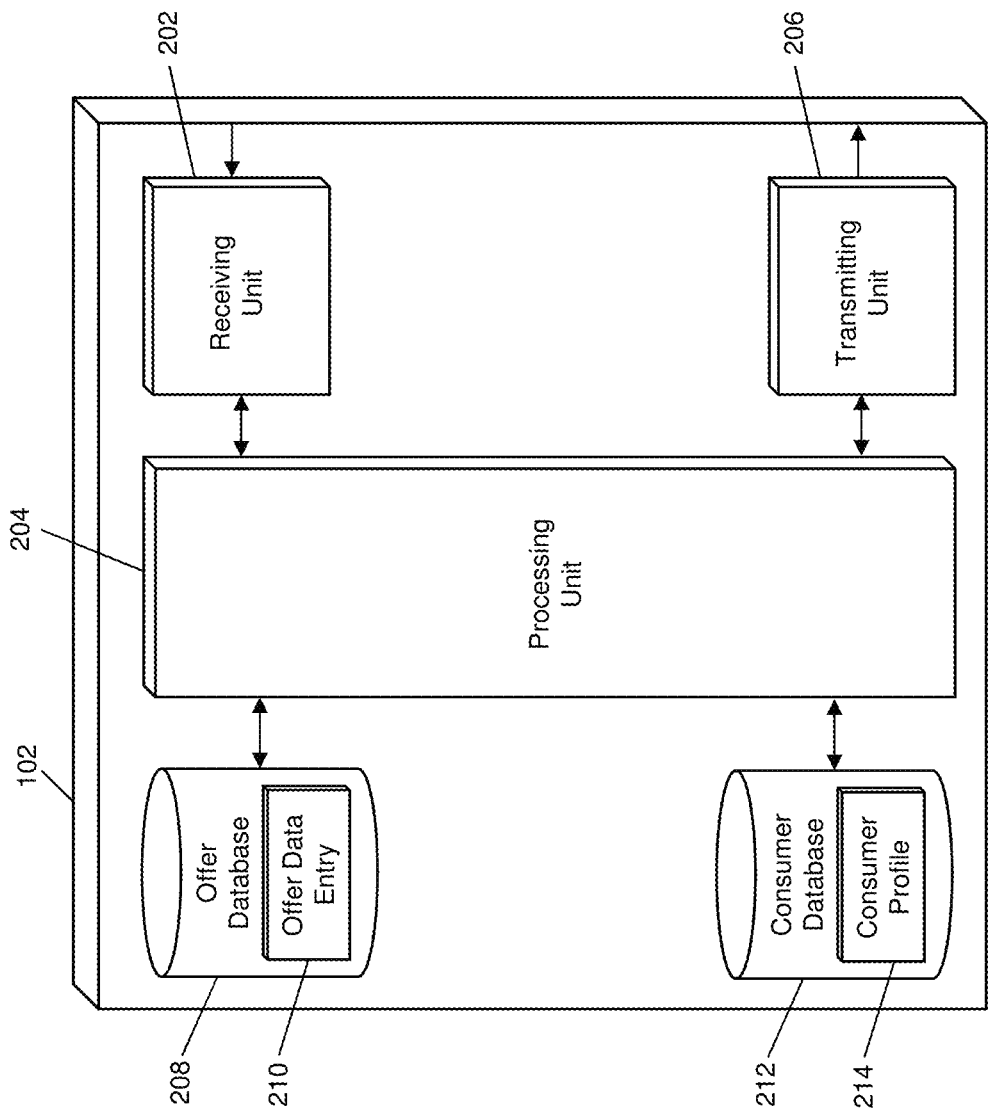
FIG. 2 is a block diagram illustrating the processing server of FIG. 1 for the assessing of a finder's fee for directing merchant traffic in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving unit 202. The receiving unit 202 may be configured to receive data over one or more networks via one or more network providers, such as the Internet, a mobile cellular network, etc. The receiving unit 202 may be configured to receive offer data related to one or more offers for the purchase of goods or services from one or more offer providers. The processing server 102 may also include a processing unit 204, which may be configured to store the received offer data in an offer database 208.

The offer database 208 may include a plurality of offer data entries 210, wherein each offer data entry 210 includes data related to an offer including at least an associated merchant, offer data, and an offer provider identifier. The associated merchant may be stored in the offer data entry 210 in the form of a merchant identifier, which may be a unique value associated with the merchant 108, a specific location of the merchant 108, a specific area of locations of the merchant 108, etc., such as a merchant identification number (MID). The offer data may include at least one of: an offer name, offer description, offer image, offer type, offer category, merchant name, merchant category, product name, product category, product description, start date, end date, offer quantity, limitations on redemption, the predetermined period of time during which the consumer 106 is to visit the merchant 108, or any other relevant data as will be apparent to persons having skill in the relevant art.

The offer provider identifier may be a unique value identifying the provider of the offer that is to receive the finder's fee if the offer successfully directs the consumer 106 to the merchant 108 within the predetermined period of time. In some instances, the offer provider identifier may be an account number corresponding to a payment account (e.g., associated with the offer provider). In such an instance, the offer provider identifier may be included in the authorization request generated by the processing server 102 to assess the finder's fee, which may be used by the payment network 112 for processing payment of the finder's fee to the offer provider.

The processing server 102 may also include a consumer database 212. The consumer database 212 may be configured to store a plurality of consumer profiles 214. Each consumer profile 214 may include data related to a consumer (e.g., the consumer 106), including a consumer identifier and a mobile device identifier. The consumer identifier may be a unique value associated with the consumer 106, such as an identification number, name, e-mail address, phone number, or the mobile device identifier. The mobile device identifier may be a unique value associated with the mobile device 104, such as a phone number, media access control (MAC) address, etc.

The processing server 102 may further include a transmitting unit 206. The transmitting unit 206 may be configured to transmit data over one or more networks via one or more network protocols. The transmitting unit 206 may transmit the offer data included in an offer data entry 210 to the mobile device 104 as identified in a specific consumer profile 214. In some instances, the transmitting unit 206 may transmit the offer directly to the mobile device 104 (e.g., via the Internet, the mobile cellular network, etc.). In other instances, the transmitting unit 206 may transmit the offer to the mobile device 104 via the mobile network operator 110.

Additional methods and systems for transmitting data to a mobile device 104 will be apparent to persons having skill in the relevant art.

The receiving unit 202 may be further configured to receive an indication (e.g., from the mobile device 104 and/or the mobile network operator 110) that the consumer 106 has viewed the transmitted offer. Methods and systems for identifying, in the mobile device 104, if the consumer 106 has viewed the offer will be apparent to persons having skill in the relevant art. In some instances, the processing unit 204 may store, in the consumer profile 214 corresponding to the consumer 106, an offer identifier of the offer transmitted to the consumer 106 and the indication that the consumer 106 has viewed the offer. In an exemplary embodiment, the processing unit 204 may store, in the consumer profile 214, the times at which the offer was distributed to the mobile device 104 and viewed by the consumer 106.

The receiving unit 202 may also receive an indication that the mobile device 104 was located at the geographic location of the merchant 108. The indication may include at least a time at which the mobile device 104 was identified at the location of the merchant 108. In some instances, the receiving unit 202 may receive the geographic location of the mobile device 104, and the processing unit 204 may identify if the geographic location corresponds to the merchant 108.

The processing unit 204 may be further configured to determine if the mobile device 104 was located at the merchant 108 within the predetermined period of time of one of the transmitting of the offer to the mobile device 104 or the viewing of the offer by the consumer 106. If the mobile device 104 was located at the merchant during the predetermined period of time, then the processing unit 204 of the processing server 102 may be configured to generate an authorization request for a payment transaction to assess a finder's fee from the merchant 108 to the offer provider. The transmitting unit 206 may be configured to transmit the generated authorization request to the payment network 112.

Method for Assessing a Finder's Fee for Directed Consumer Traffic

Figure 3:
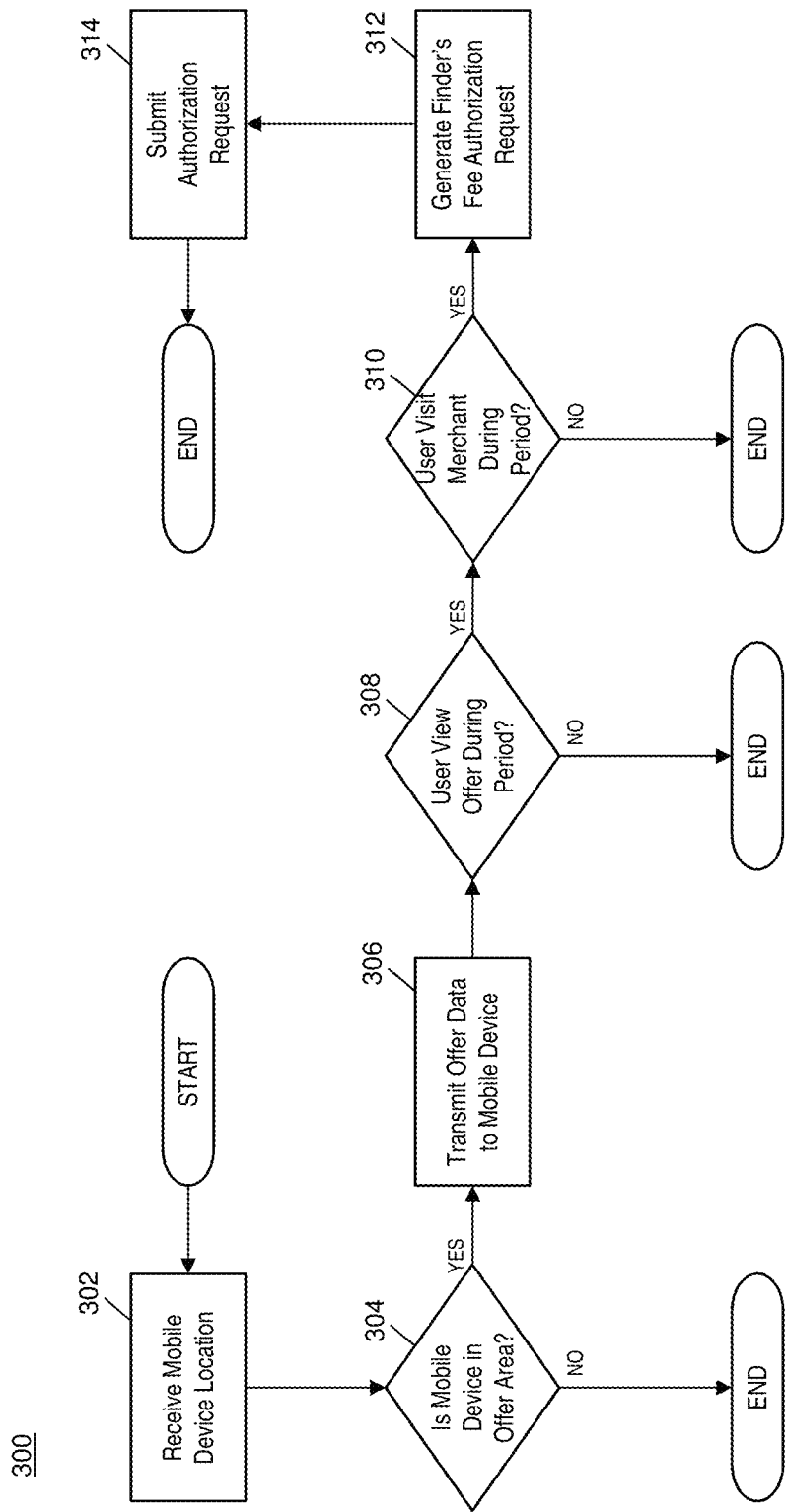
FIG. 3 is a flow diagram illustrating a process for identifying offer-driven consumer traffic and assessing a finder's fee based thereon in accordance with exemplary embodiments.

FIG. 3 illustrates a method 300 for the assessing of a finder's fee from the merchant 108 to the offer provider for the directing of the consumer 106 to the merchant 108.

In step 302, the receiving unit 202 of the processing server 102 may receive the geographic location of the mobile device 104. In some instances, the geographic location may be represented by at least one of: a latitude and longitude, a zip or postal code, or a street address. In step 304, the processing unit 204 may determine if the mobile device 104 is located within a geographic area associated with an offer stored in the offer database 208. If the mobile device 104 is not in an eligible area, then the process 300 may be completed.

If the mobile device 104 is located within the eligible area for an offer, then the transmitting unit 206 of the processing server 102 may transmit, to the mobile device 104, the offer data in the offer data entry 210 corresponding to the offer, in step 306. In step 308, the processing unit 204 may determine if an indication has been received indication that the consumer 106 has viewed the transmitted offer during the predetermined period of time. If the consumer 106 has not viewed the offer during the period, then the process 300 may be completed.

If an indication is received indication that the consumer 106 did view the offer during the predetermined period of time, then, in step 310, the processing unit 204 may determine if the consumer 106 have visited the merchant 108 within the predetermined period of time. The processing unit 204 may determine if the consumer 106 has visited the merchant 108 based on the receipt of an indication of the mobile device 104 being located at the merchant 108 during the predetermined period of time. In some instances, the receiving unit 202 may receive a geographic location of the mobile device 104, and the processing unit 204 may determine if the geographic location of the mobile device 104 is associated with the merchant 108 and/or within a specified proximity of the merchant 108.

If the processing unit 204 determines that the consumer 106 did not visit the merchant 108 during the predetermined period of time (e.g., the mobile device 104 was not identified at the merchant 108), then the process 300 may be completed. If the consumer 106 did visit the merchant 108 during the predetermined period of time, then, in step 312, the processing unit 204 of the processing server 102 may generate an authorization request for a payment transaction to assess a finder's fee payment from the merchant 108 to the offer provider. In step 314, the transmitting unit 206 may submit the authorization request to the payment network 112 for processing.

Identifying Consumer Behavior for Assessment of a Finder's Fee

Figure 4:
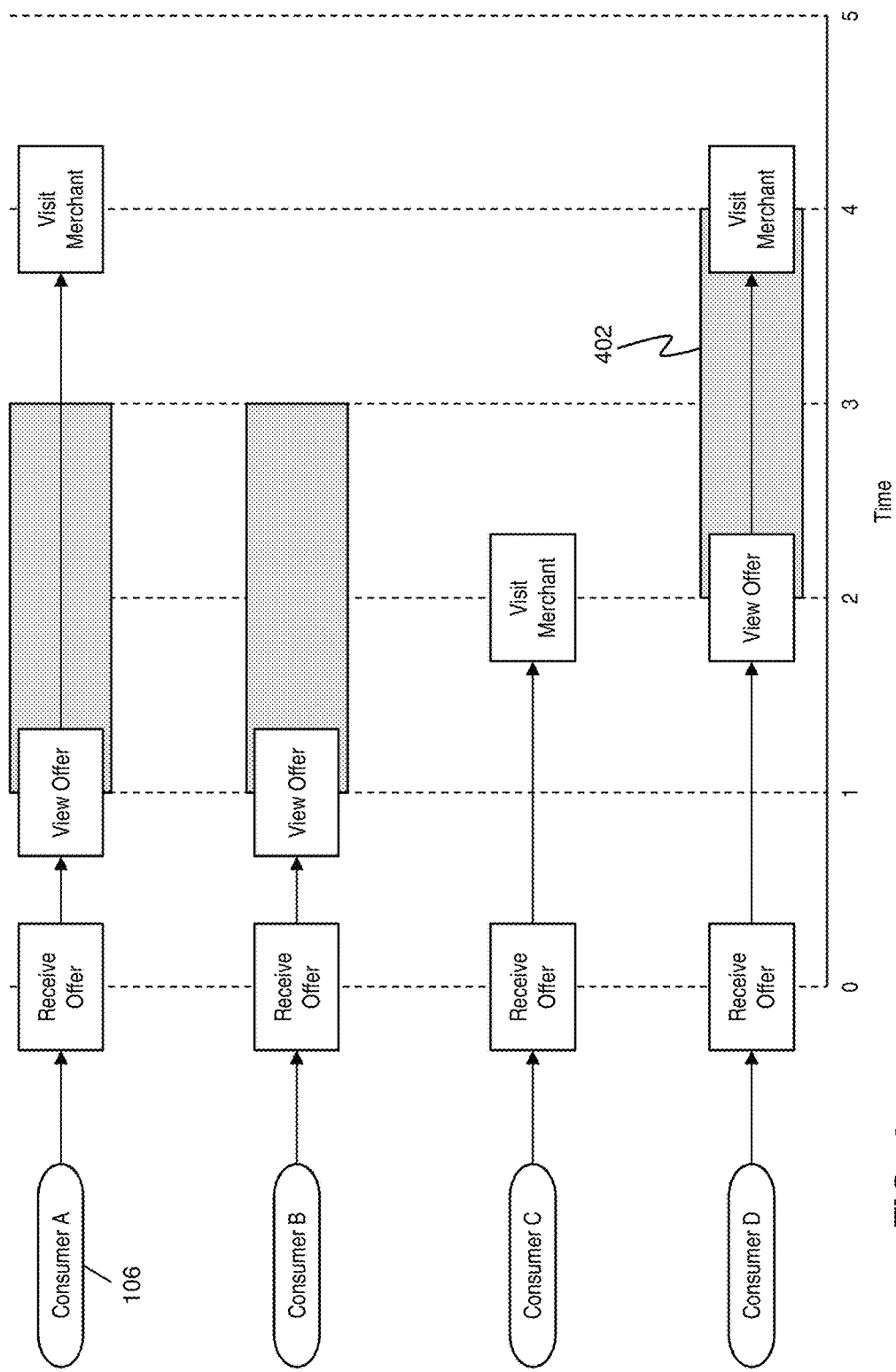
FIG. 4 is a flow diagram illustrating consumer behaviors for the assessing of finder's fee in the system of FIG. 1 in accordance with exemplary embodiments.

FIG. 4 illustrates potential behavior of multiple consumers in the system of 100 for the potential assessment of a finder's fee to the offer provider for the directing of traffic to the merchant 108.

Four consumers 106, illustrated in FIG. 4 as consumer A, consumer B, consumer C, and consumer D, may each receive an offer associated with the merchant 108 at a time represented as time 0. In the example illustrated in FIG. 4, the predetermined period of time 402 may not start until each consumer 106 has viewed the offer. It will be apparent to persons having skill in the relevant art that, in some embodiments, the predetermined period of time 402 may start when the mobile device 104 receives the offer, such as at time 0 as illustrated in FIG. 4. In some instances, the merchant 108 and/or the offer provider may determine the start time for the predetermined period of time 402, which may be stored in the related offer data entry 210 in the offer database 208.

Consumer A may view the offer at time 1, which may start the predetermined period of time 402. The predetermined period of time for the example illustrated in FIG. 4 may be two time periods. Consumer A views the offer at time 1, but waits until time 4 to visit the merchant 108. As a result, consumer A does not visit the merchant within the predetermined period of time 402, which expires at time 3. Accordingly, no finder's fee may be assessed. Consumer B may view the offer at time 1, which may start the predetermined period of time 402 to end at time 3. However, consumer B never visits the merchant 108, which results in no assessment of a finder's fee.

Consumer C receives the offer at time 0, and then visits the merchant 108 at time 2. Although consumer C receives the offer and visits the merchant 108, because there is no indication that consumer C ever viewed the offer, the processing server 102 may be unable to determine that the offer drove consumer C to visit the merchant 108 and may accordingly not assess a finder's fee. In some embodiments, if the consumer views the offer after visiting the merchant 108, the finder's fee may still be assessed. In such an embodiment, the predetermined period of time 402 for such an instance and/or the start time for the predetermined period of time 402 may be different from the predetermined period of time 402 used when a consumer 106 views an offer prior to visiting the merchant 108.

Consumer D receives the offer at time 0, and views the offer at time 2, which starts the predetermined period of time 402. Consumer D then visits the merchant 108 at time 4, prior to the expiration of the predetermined period of time 402. Because consumer D visits the merchant 108 within the predetermined period of time 402, the processing server 102 may generate and submit an authorization request for the assessment of a finder's fee to be paid by the merchant 108 to the offer provider. In some embodiments, if consumer D engages in a transaction with the merchant 108 during their visit, then the processing server 102 may assess an additional referral fee to be paid by the merchant 108. In a further embodiment, the referral fee may only be assessed if consumer D redeems the offer received at time 0.

Exemplary Method for Assessing a Finder's Fee for Directing Merchant Traffic

Figure 5:
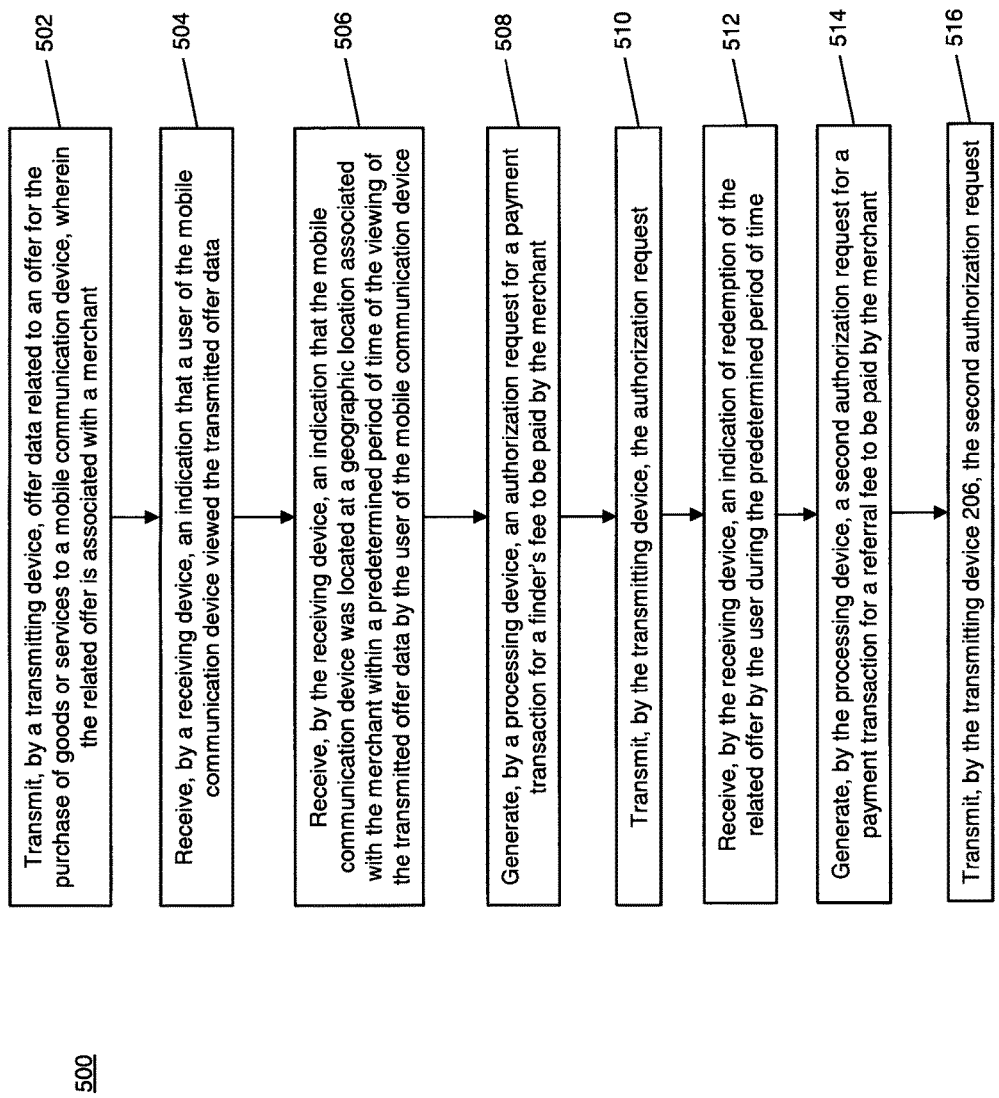
FIG. 5 is a flow chart illustrating an exemplary method for assessing a finder's fee for directing merchant traffic in accordance with exemplary embodiments.

FIG. 5 illustrates a method 500 for assessing a finder's fee for directing a consumer 106 to a merchant 108 via the distribution of an offer to a mobile device 104 associated with the consumer 106.

In step 502, offer data related to an offer for the purchase of goods or services may be transmitted, by a transmitting device (e.g., the transmitting device 206), to a mobile communication device (e.g., the mobile device 104), wherein the related offer is associated with a merchant (e.g., the merchant 108). In some embodiments, the offer data may be transmitted to the mobile communication device 104 when the mobile communication device 104 is within a predefined area associated with the merchant 108. In one embodiment, the offer data may include at least one of: offer name, offer description, offer image, offer amount, offer type, offer category, merchant name, merchant category, product name, product category, product description, start date, end date, offer quantity, and limitations on redemption.

In step 504, a receiving device (e.g., the receiving unit 202) may receive an indication that a user (e.g., the consumer 106) of the mobile communication device 104 viewed the transmitted offer data. In step 506, the receiving device 202 may receive an indication that the mobile communication device 104 was located at a geographic location associated with the merchant 108 within a predetermined period of time (e.g., the predetermined period of time 402) of the viewing of the transmitted offer data by the user 106 of the mobile communication device 104. In one embodiment, the predetermined period of time may start either when the user views the offer data on the mobile communication device 104 or when the mobile communication device 104 is identified at the geographic location.

In another embodiment, the predetermined period of time may be based on at least one of: the offer data, an industry associated with the merchant 108, the merchant 108, the geographic location, a time at which the offer data was transmitted to the mobile communication device 104, and the user 106 of the mobile communication device 104. In one embodiment, the user 106 may have viewed the transmitted offer data after the mobile communication device 104 was located at the geographic location associated with the merchant 108. In some embodiments, the geographic location of the mobile communication device 104 may be identified by at least one of the mobile communication device 104 and a mobile network operator (e.g., the mobile network operator 110) using at least one of: a global positioning system, cellular network triangulation, wireless access point identification, and reading of a machine-readable code located at the geographic location. In one embodiment, the geographic location may be one of a plurality of latitude and longitude coordinates associated with a physical location of the merchant 108.

In step 508, an authorization request for a payment transaction for a finder's fee to be paid by the merchant 108 may be generated by a processing device (e.g., the processing unit 204). In step 510, the transmitting device 206 may transmit the authorization request. In one embodiment, the method 500 may further include: receiving, by the receiving device 202, an indication of redemption of the related offer by the user 106 during the predetermined period of time 402 (Step 512); generating, by the processing device 204, a second authorization request for a payment transaction for a referral fee to be paid by the merchant 108 (Step 514); and transmitting, by the transmitting device 206, the second authorization request (Step 516).

Computer System Architecture

Figure 6:
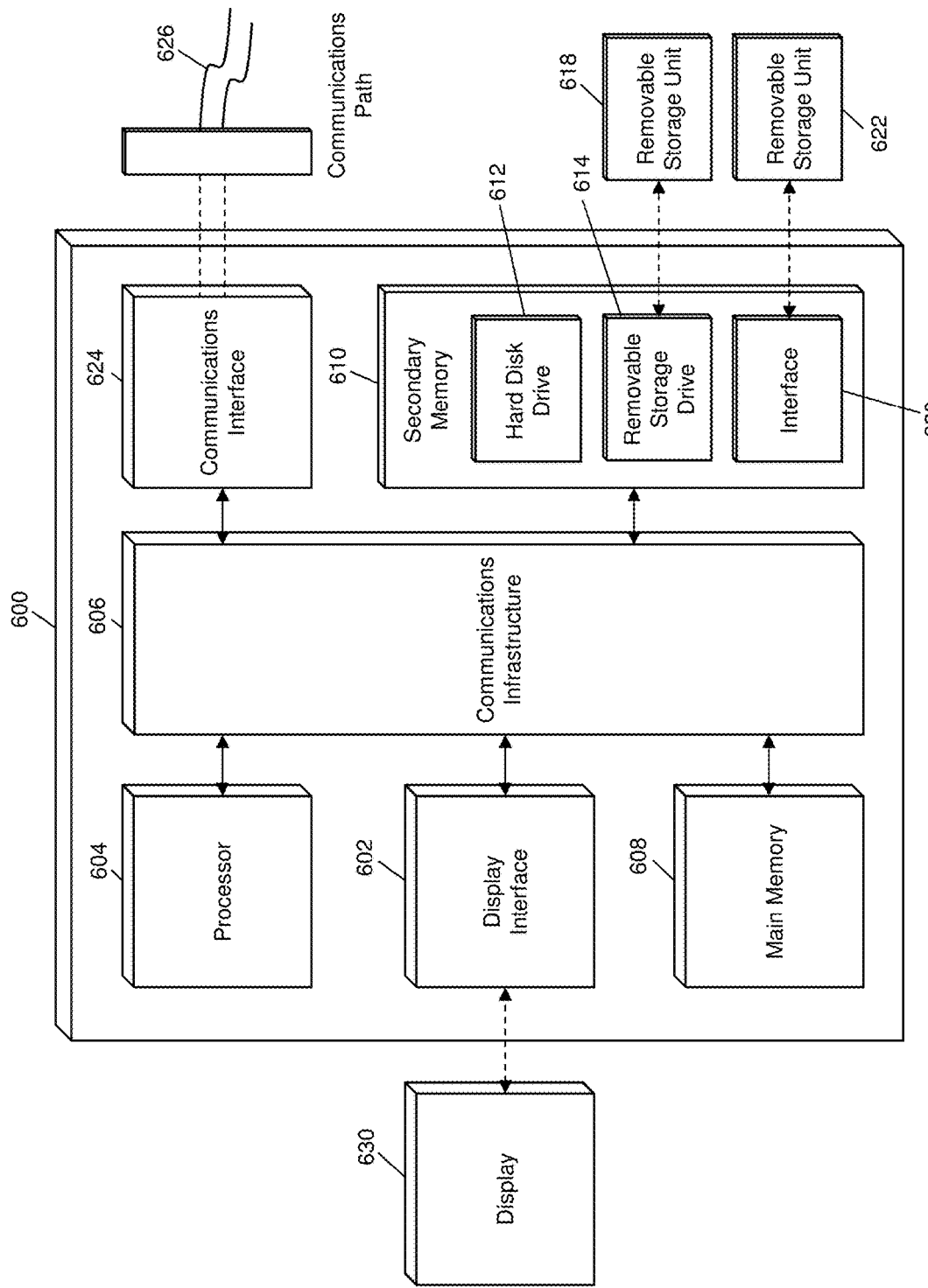
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device or unit as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. The processor device 604 may be connected to a communication infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive, the removable storage unit 618 may be a floppy disk. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

Techniques consistent with the present disclosure provide, among other features, systems and methods for providing characteristic payments data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for assessing a finder's fee for directing merchant traffic, comprising:
   transmitting, by a transmitting device, offer data related to an offer for the purchase of goods or services to a mobile communication device, wherein the related offer is associated with a merchant;
   receiving, by a receiving device, an indication that a user of the mobile communication device viewed the transmitted offer data;
   receiving, by the receiving device, an indication that the mobile communication device was located at a geographic location associated with the merchant within a predetermined period of time after the viewing of the transmitted offer data by the user of the mobile communication device, wherein the geographic location of the mobile communication device is identified using at least one of: (a) a global positioning system, (b) cellular network triangulation, (c) wireless access point identification, and (d) reading of a machine-readable code located at the geographic location, by at least one of: (i) the mobile communication device and (ii) a mobile network operator;
   generating, by a processing device, a first authorization request for a payment transaction for a finder's fee to be paid by the merchant at least based upon the received indication that the mobile communication device was located at the geographic location associated with the merchant within the predetermined period of time;
   transmitting, by the transmitting device, the first authorization request;
   receiving, by the receiving device, an indication of redemption of the related offer by the user during the predetermined period of time;
   generating, by the processing device, a second authorization request for a payment transaction for a referral fee to be paid by the merchant; and
   transmitting, by the transmitting device, the second authorization request.

2. The method of claim 1, wherein the user viewed the transmitted offer data after the mobile communication device was located at the geographic location associated with the merchant.

3. The method of claim 1, wherein the offer data is transmitted to the mobile communication device when the mobile communication device is within a predefined area associated with the merchant.

4. The method of claim 1, wherein the geographic location is one of a plurality of latitude and longitude coordinates associated with a physical location of the merchant.

5. The method of claim 1, wherein the offer data includes at least one of: offer name, offer description, offer image, offer amount, offer type, offer category, merchant name, merchant category, product name, product category, product description, start date, end date, offer quantity, and limitations on redemption.

6. The method of claim 1, wherein the predetermined period of time starts when either the user views the offer data on the mobile communication device or the mobile communication device is identified at the geographic location.

7. The method of claim 1, wherein the predetermined period of time is based on at least one of: the offer data, an industry associated with the merchant, the merchant, the geographic location, a time at which the offer data was transmitted to the mobile communication device, and the user of the mobile communication device.

8. A system for assessing a finder's fee for directing merchant traffic, comprising:
   a transmitting device configured to transmit offer data related to an offer for the purchase of goods or services to a mobile communication device, wherein the related offer is associated with a merchant;
   a receiving device configured to
      receive an indication that a user of the mobile communication device viewed the transmitted offer data, and
      receive an indication that the mobile communication device was located at a geographic location associated with the merchant within a predetermined period of time after the viewing of the transmitted offer data by the user of the mobile communication device wherein the geographic location of the mobile communication device is identified using at least one of: (a) a global positioning system, (b) cellular network triangulation, (c) wireless access point identification, and (d) reading of a machine-readable code located at the geographic location, by at least one of the mobile communication device or a mobile network operator; and
   a processing device configured to generate a first authorization request for a payment transaction for a finders fee to be paid by the merchant at least based upon the received indication that the mobile communication device was located at the geographic location associated with the merchant within the predetermined period of time, wherein;
   the transmitting device is further configured to transmit the first authorization request,
   the receiving device is further configured to receive an indication of redemption of the related offer by the user during the predetermined period of time,
   the processing device is further configured to generate a second authorization request for a payment transaction for a referral fee to be paid by the merchant, and
   the transmitting device is further configured to transmit the second authorization request.

9. The system of claim 8, wherein the user viewed the transmitted offer data after the mobile communication device was located at the geographic location associated with the merchant.

10. The system of claim 8, wherein the offer data is transmitted to the mobile communication device when the mobile communication device is within a predefined area associated with the merchant.

11. The system of claim 8, wherein the geographic location is one of a plurality of latitude and longitude coordinates associated with a physical location of the merchant.

12. The system of claim 8, wherein the offer data includes at least one of: offer name, offer description, offer image, offer amount, offer type, offer category, merchant name, merchant category, product name, product category, product description, start date, end date, offer quantity, and limitations on redemption.

13. The system of claim 8, wherein the predetermined period of time starts when either the user views the offer data on the mobile communication device or the mobile communication device is identified at the geographic location.

14. The system of claim 8, wherein the predetermined period of time is based on at least one of: the offer data, an industry associated with the merchant, the merchant, the geographic location, a time at which the offer data was transmitted to the mobile communication device, and the user of the mobile communication device.

\* \* \* \* \*